United States Patent
Hinson (10) Patent No.: US 9,152,254 B2
(45) Date of Patent: Oct. 6, 2015

(54) ELECTRICAL CONNECTION FOR ACTIVE-STYLUS ELECTRODE

(71) Applicant: Nigel Hinson, Lymington (GB)

(72) Inventor: Nigel Hinson, Lymington (GB)

(73) Assignee: Atmel Corporation, San Jose, CA (US)

( * ) Notice: Subject to any disclaimer, the term of this patent is extended or adjusted under 35 U.S.C. 154(b) by 61 days.

(21) Appl. No.: 14/086,626

(22) Filed: Nov. 21, 2013

(65) Prior Publication Data

US 2015/0138164 A1    May 21, 2015

(51) Int. Cl.
  *G06F 3/038* (2013.01)
  *G06F 3/0354* (2013.01)

(52) U.S. Cl.
  CPC .......... *G06F 3/0383* (2013.01); *G06F 3/03545* (2013.01)

(58) Field of Classification Search
  CPC ............ G06F 3/03545; G06F 3/04883; G06F 3/0317; G06F 1/1626; G06F 3/0416; G06F 4/044; G06F 2203/04111; G06F 2203/04112; G06K 9/222
  USPC .......................... 345/156, 158, 174, 176, 179; 178/18.01–18.09, 19.01–19.07, 178/20.01–20.04
  See application file for complete search history.

(56) References Cited

U.S. PATENT DOCUMENTS

| | | | |
|---|---|---|---|
| 5,885,881 A * | 3/1999 | Ojha | 438/381 |
| 7,663,607 B2 | 2/2010 | Hotelling | |
| 7,785,027 B1 * | 8/2010 | McKinley et al. | 401/195 |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2008/0055279 A1 * | 3/2008 | Osada et al. | 345/179 |
| 2008/0309635 A1 | 12/2008 | Matsuo | |
| 2009/0115725 A1 * | 5/2009 | Shemesh et al. | 345/158 |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — MD Saiful A Siddiqui
(74) *Attorney, Agent, or Firm* — Baker Botts L.L.P.

(57) ABSTRACT

In one embodiment, an active stylus includes one or more computer-readable non-transitory storage media embodying logic for wirelessly communicating with a device through a touch sensor of the device. The active stylus also includes an electrode for wirelessly receiving or transmitting signals through the touch sensor of the device to enable the communication, wherein the electrode is disposed at or near a tip of the active stylus. The active stylus further includes a conductive element providing at least a portion of a connection between the electrode and the media. The conductive element is made of a single piece of conductive material and includes a first end connected to a circuit board of the active stylus that the media is disposed on. The conductive element also includes a second end that includes a deformable ring configured to fit within an interior portion of the electrode.

10 Claims, 6 Drawing Sheets

(56) References Cited

U.S. PATENT DOCUMENTS

| | | |
|---|---|---|
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0168116 A1* | 6/2014 | Sasselli et al. ............... 345/173 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

ELECTRICAL CONNECTION FOR ACTIVE-STYLUS ELECTRODE

TECHNICAL FIELD

This disclosure generally relates to electrical connections for active-stylus electrodes.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
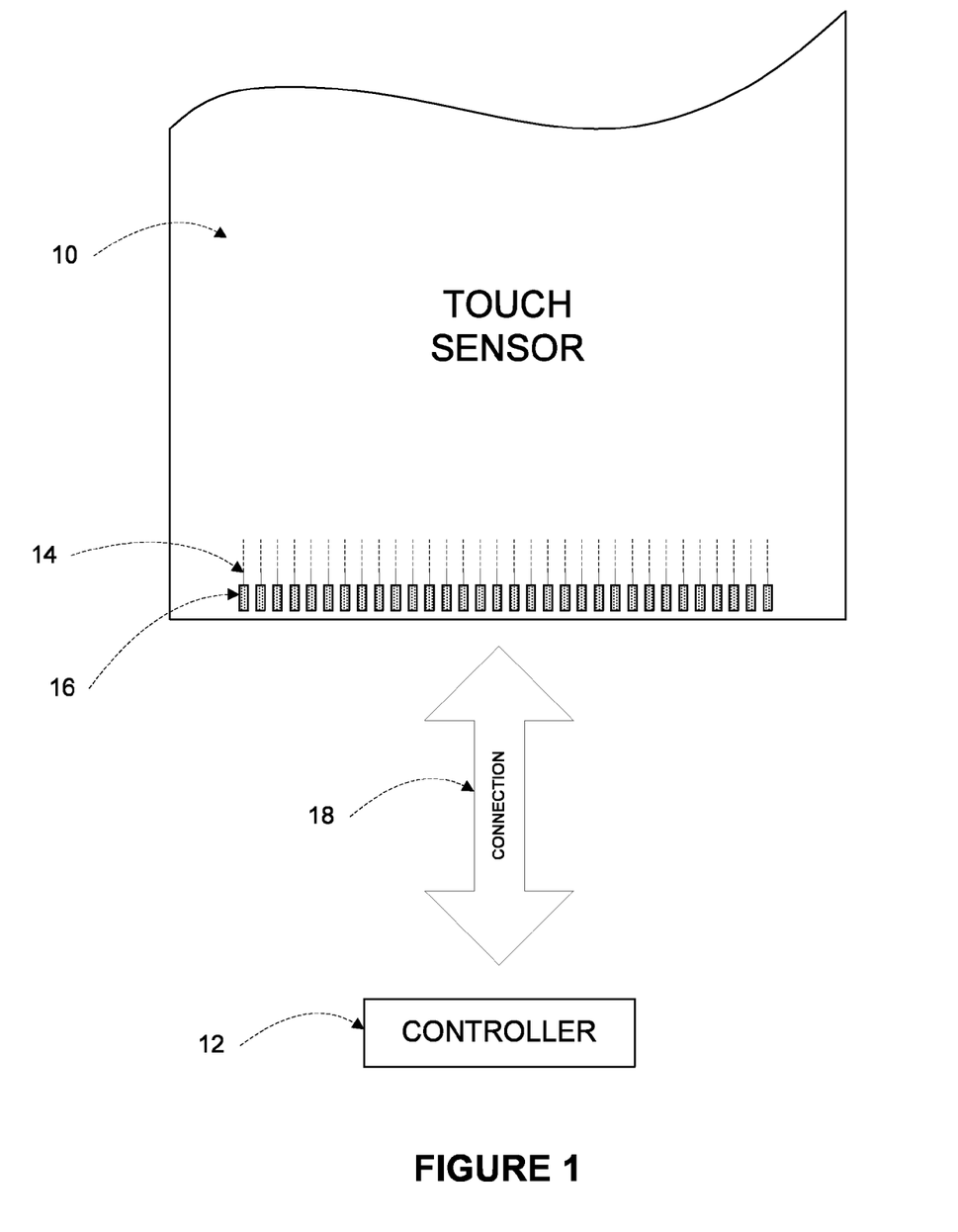
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
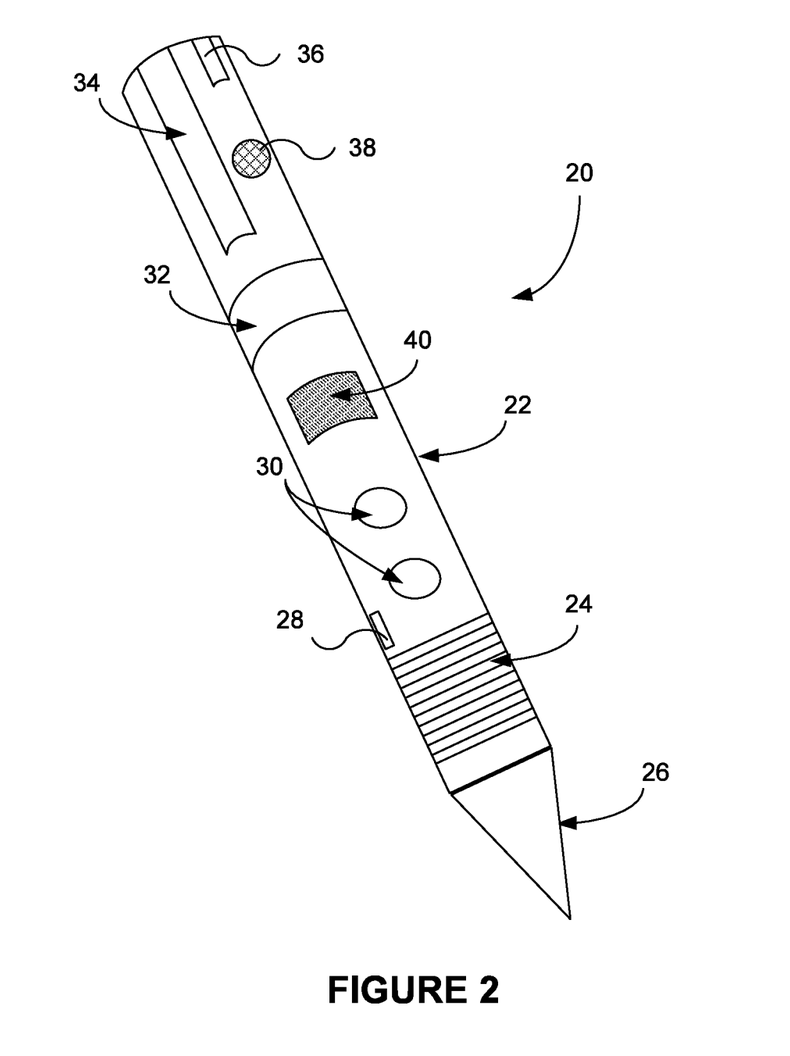
FIG. 2 illustrates an example active stylus exterior.

FIG. 2 illustrates an example exterior of an example active stylus 20, which may be used in conjunction with touch sensor 10 of FIG. 1. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using an FPC.

Active stylus 20 may have one or more components configured to provide feedback to or accept feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or an electrophoretic display. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example and not by way of limitation, dragging a finger across modified surface area 40 may initiate an interaction, such as data transfer, between active stylus 20 and a device.

One or more components of active stylus 20 may be configured to communicate data between active stylus 20 and a device. For example, active stylus 20 may have a tip region 26 (or tip 26) located at an end of active stylus 20, and one or more electrodes may be disposed at or near tip 26 of active stylus 20. In particular embodiments, tip 26 may include one or more electrodes for wirelessly receiving or transmitting signals between active stylus 20 and one or more devices or other active styluses. By way of example and without limitation, the electrodes of active stylus 20 may reside on outer body 22 of active stylus, in or near active-stylus tip 26, or on or in any other suitable part of active stylus 20.

In particular embodiments, tip 26 may include one or more nibs, where nib may refer to a terminal end or a point of tip 26 that makes contact with or interacts with touch sensor 10. Tip 26 may provide or communicate pressure or force information (e.g., the amount of pressure or force being exerted by or on active stylus 20 through tip 26 or nib of tip 26) between active stylus 20 and one or more devices or other active styluses. Tip 26 may be made of any suitable material, such as a conductive material, an insulating or non-conductive material, or any suitable combination of conductive and non-conductive materials. Tip 26 may have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
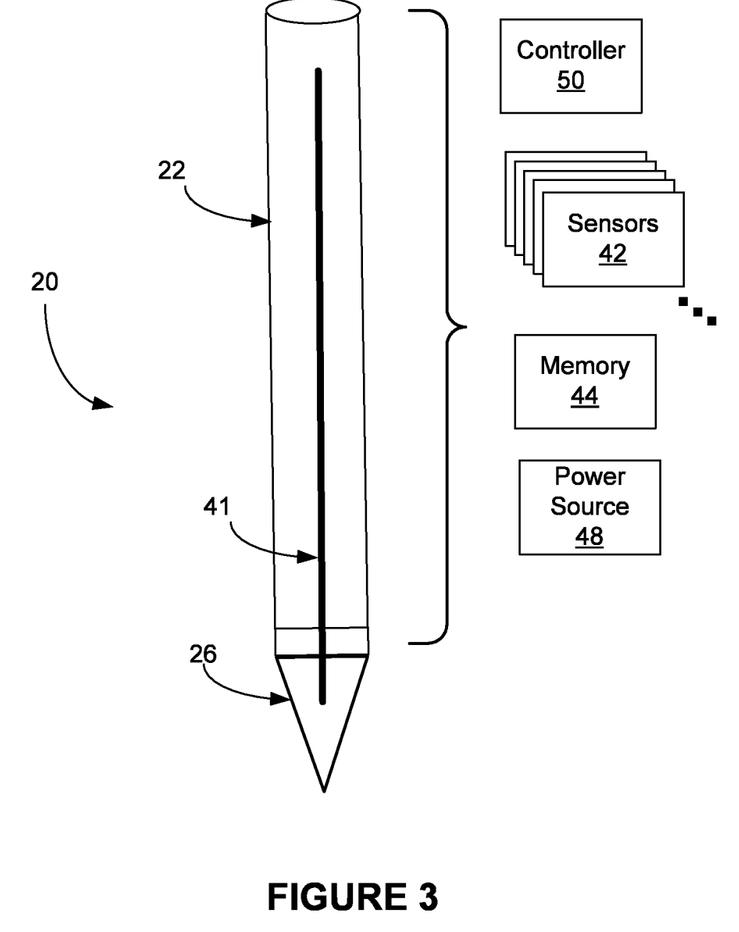
FIG. 3 illustrates an example active stylus interior.

FIG. 3 illustrates example internal components of an example active stylus 20. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low-energy data transmission or modulation link, such as, for example and without limitation, via a radio frequency (RF) communication link. In this case, active stylus 20 includes a RF device for transmitting data over the RF link.

Controller 50 may be a microcontroller or any other type of computing device or processor suitable for controlling the operation of active stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in active stylus 20, either via drive or sense units or directly. The drive unit may supply signals to one or more electrodes of tip 26 through conduit 41, which may be referred to as center shaft 41. In particular embodiments, conduit 41 may provide at least a portion of an electrical connection between controller 50 and one or more electrodes or sensors located at or near tip 26. In particular embodiments, conduit 41 may include electrical wiring, an FPC, a section of an FPC, a printed-circuit board (PCB), any combination of wiring, FPC, or PCB, or any suitable means for coupling an electrical line or signal between electrical devices or components. The drive unit may also supply signals to control or drive sensors 42 or one or more external components of active stylus 20. In particular embodiments, the drive unit of active stylus 20 may be configured to transmit a signal that may be detected by electrodes of touch sensor 10. As an example and not by way of limitation, the drive unit of active stylus 20 may include a voltage pump or a switch, such that the voltage pump may generate a high-voltage signal, or the switch may toggle the potential of one or more electrodes of tip 26 between zero voltage and one or more pre-determined voltage levels. The drive unit of active stylus 20 may transmit a signal, such as a square wave, sine wave, or digital-logic signal, that may be sensed by the electrodes of touch sensor 10. In particular embodiments, the drive unit of active stylus 20 may transmit a signal to electrodes of touch sensor 10 by applying a voltage or current to one or more electrodes of tip 26 that results in charge removal or charge addition to the electrodes of touch sensor 10, mimicking a touch or anti-touch of a finger on a pulse-by-pulse basis.

The sense unit may sense signals received by one or more electrodes of tip 26 through conduit 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, force sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, force, contact, pressure on outer body 22, force on tip 26, vibration, or any other suitable characteristic of active stylus 20. In particular embodiments, tip 26 may include a force sensor (e.g., a piezoelectric force sensor) for measuring a force applied to a nib or terminal end of tip 26. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered or recharged by a wired connection through an applicable port coupled to a suitable power source.

Figure 4:
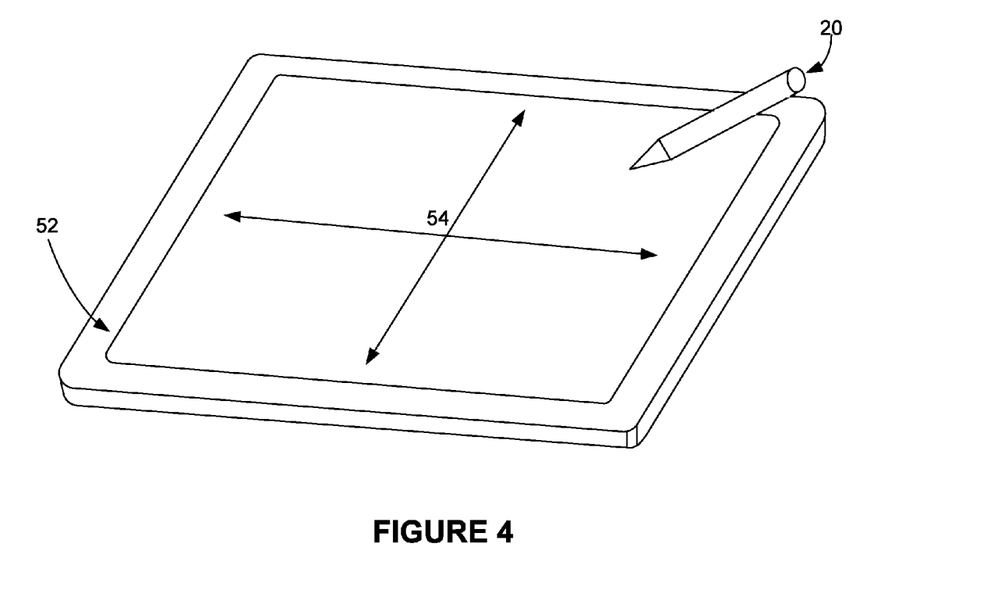
FIG. 4 illustrates an example active stylus with an example device.

FIG. 4 illustrates an example active stylus 20 with an example device 52. One example of device 52 is touch screen 10 of FIG. 1. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example and not by way of limitation, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of signals or data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device 52 by processing a drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. In particular embodiments, after active stylus 20 and device 52 are synchronized, active stylus 20 may transmit data to device 52 by performing charge addition or charge removal on one or more sense electrodes of touch sensor 10, and device 52 may receive data sent from active stylus 20 by sensing data with one or more sense electrodes of touch sensor 10. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, noise from device 52 display, stylus circuitry noise, or external noise. The overall noise external to active stylus 20 may have frequency characteristics covering a wide range of the spectrum, including narrow-band noise and wide-band noise, as well. In particular embodiments, a signal received by active stylus 20 may be amplified by any suitable amplifier, including a digital or an analog amplifier. In particular embodiments, a signal received by active stylus 20 may be filtered by any suitable filter, including a digital or an analog filter.

Figure 5:
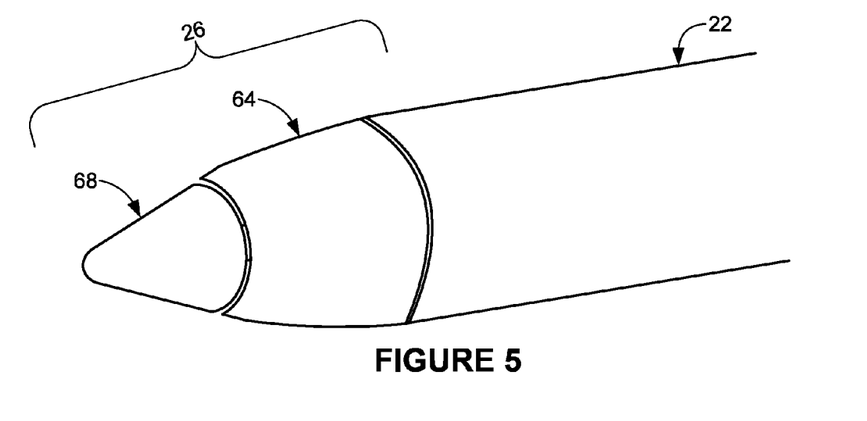
FIG. 5 illustrates an example end portion of an example active stylus.

FIG. 5 illustrates an example end portion of an example active stylus 20, including active-stylus tip 26 and a portion of active-stylus outer body 22. In particular embodiments, tip 26 may include one or more electrodes 64 and 68, and electrodes 64 and 68 may reside within, on, or near active-stylus tip 26. In particular embodiments, an active-stylus electrode configured to wirelessly sense or receive a signal from a device 52 may be referred to as a receive electrode. In particular embodiments, an electrode configured to wirelessly send or transmit a signal from active stylus 20 to device 52 may be referred to as a transmit electrode. In particular embodiments, electrode 64 may be configured as a transmit or receive electrode, and electrode 68 may be configured as a transmit or receive electrode. As an example an not by way of limitation, electrode 64 may be configured as a receive electrode, and electrode 68 may be configured as a transmit electrode. As another example, electrode 64 may be configured as a transmit electrode, and electrode 68 may be configured as a receive electrode.

Figure 6:
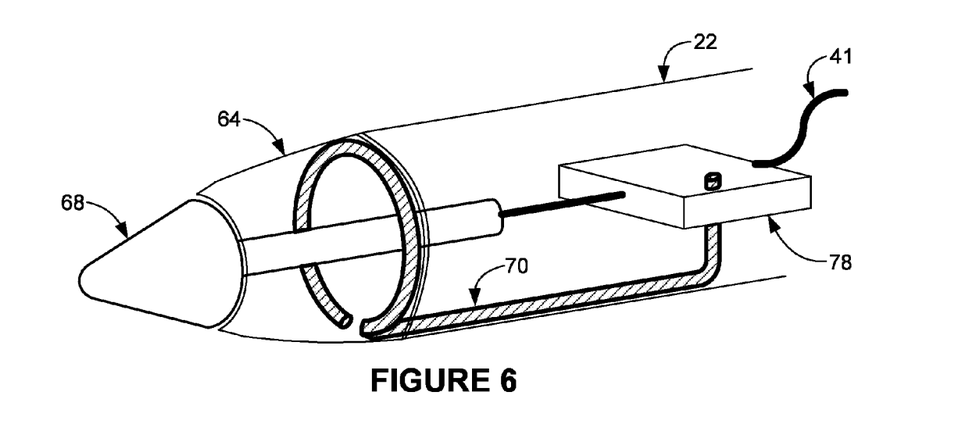
FIG. 6 illustrates a cutaway view of the example active-stylus end portion of FIG. 5.

FIG. 6 illustrates a cutaway view of the example active-stylus 20 end portion of FIG. 5. In particular embodiments, device 52 may wirelessly transmit a signal to active stylus 20 by sending a signal to one or more drive electrodes of touch sensor 10, and active stylus 20 may receive the signal via one or more receive electrodes 64 of tip 26. A receive electrode 64 may be electrically coupled to controller 50, and a signal received by receive electrode 64 may be transmitted or coupled to controller 50. Controller 50, as discussed above, may include, without limitation, a drive unit, a sense unit, a storage unit, and a processor unit. In particular embodiments, a signal may be coupled from receive electrode 64 to controller 50 via conduit 41, a conductive element 70, an FPC, a PCB 78, or any suitable combination of such suitable components. Similarly, in particular embodiments, a signal may be sent from controller 50 and coupled to transmit electrode 68 via conduit 41, a conductive element, an FPC, a PCB 78, or any suitable combination of such suitable components. In particular embodiments, a signal coupled from controller 50 to transmit electrode 68 may be wirelessly sent to device 52 by transmit electrode 68.

In particular embodiments, electrode 64 or electrode 68 may be made of an electrically conductive material, such as for example aluminum, copper, or any suitable conductive metal or other conductive material. In particular embodiments, electrode 64 or electrode 68 may be made of an electrically conductive material with a non-conductive coating or covering, such as for example an anodized coating, a coating of paint or plastic, or a plastic or rubber covering. In particular embodiments, electrode 64 or electrode 68 may include two or more parts or regions, where each of the regions is made of a different material. As an example and not by way of limitation, electrode 64 or electrode 68 may include a portion made of an electrically conductive material and another portion made of an electrically insulating (or, electrically non-conductive) material, such as for example plastic or rubber. In particular embodiments, electrode 64 or electrode 68 disposed in, on, or near active stylus tip 26 may be formed from electrically conductive material, resistive material, or insulating material, or any suitable combination of such suitable materials.

In particular embodiments, electrode 68 may have a terminal end, or nib, with a tapered or rounded shape. In particular embodiments, electrode 68 may have a terminal end that forms a substantially sharp or pointed end. In particular embodiments, electrode 68 may have a terminal end that forms a substantially blunt or flat end. In particular embodiments, a portion of electrode 68 may include electrically conductive material that extends from or near the nib to the opposite end of electrode 68, and the opposite end of electrode 68 may be electrically coupled to controller, as described above. In particular embodiments, electrode 64 may have a substantially circular, conical, cylindrical, or ring-like shape. In particular embodiments, electrode 64 may have a shape of a truncated cone. In particular embodiments, electrode 64 may have a tapered profile where a transverse dimension (e.g., inner or outer diameter) of electrode 64 may be smaller near a nib end of tip 26 and larger away from the nib end. In particular embodiments, electrode 64 may include a hollow region, a void, or an interior portion that extends substantially through a center of electrode 64 and is aligned substantially along a longitudinal axis of active stylus 20. In particular embodiments, all or a portion of electrode 64 may surround or encircle a portion of electrode 68, and a portion of electrode 68 may pass through the interior portion of electrode 64. Although this disclosure describes or illustrates particular electrodes made of particular materials and having particular shapes, this disclosure contemplates any suitable electrodes made of any suitable materials and having any suitable shapes.

Figure 7:
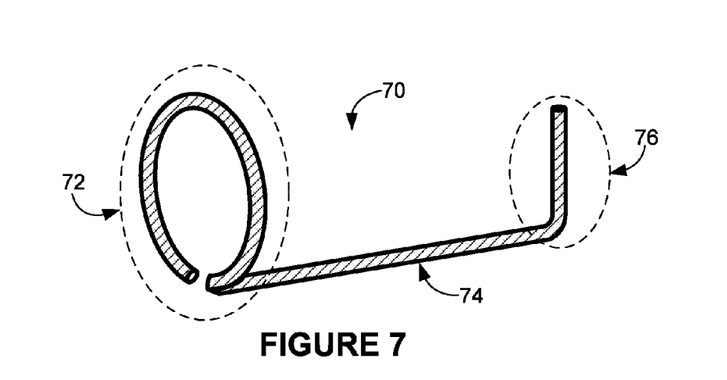
FIG. 7 illustrates an example electrode coupler.

FIG. 7 illustrates an example electrode coupler 70. In particular embodiments, electrode coupler 70 may be referred to as a conductive element 70, and electrode coupler 70 may electrically couple electrode 64 to controller 50, conduit 41, or PCB 78. In particular embodiments, electrode coupler 70 may provide at least a portion of an electrical connection between electrode 70 and controller 50. In the example of FIG. 7, electrode coupler 70 includes a ring end 72, a rod section 74, and a back end 76. In particular embodiments, ring end 72 of electrode coupler 70 may be configured to make electrical contact with electrode 64, and back end 76 of electrode coupler 70 may be electrically coupled to controller 50, conduit 41, or PCB 78. Rod section 74 may include a length of electrode coupler 70 that connects ring end 72 and back end 76.

In FIGS. 6 and 7, ring end 72 has a substantially circular shape oriented approximately orthogonal to a longitudinal axis of active stylus 20, and ring end 72 has a center approximately coincident with a central longitudinal axis of active stylus 20. In particular embodiments, ring end 72 may have a semicircular shape, an elliptical shape, a semielliptical shape, or any suitable shape. In particular embodiments, ring end 72 may be formed in a substantially circular shape that includes a single turn or loop. In FIG. 7, back end 76 of electrode coupler 70 has an "L" shape (or, a substantially right-angled shape) and is electrically coupled, such as for example with solder, to PCB 78. In particular embodiments, back end 76 may be substantially straight, bent, or curved to form any suitable shape. In particular embodiments, back end 76 of electrode coupler 70 may be electrically connected to an FPC or a circuit board (e.g., PCB 78) that controller 50 is disposed on. In particular embodiments, back end 76 may be electrically coupled to controller 50 via conduit 41, an FPC, PCB 78, or any suitable combination of such suitable components. Although this disclosure describes and illustrates particular electrode couplers 70 having particular shapes, this disclosure contemplates any suitable electrode coupler 70 having any suitable shape.

In particular embodiments, electrode coupler 70 may be made from a single piece of electrically conductive material. In particular embodiments, electrode coupler 70 may be made of an electrically conductive metal, such as for example, aluminum, copper, steel, spring steel, carbon steel, bronze, stainless steel, or any suitable electrically conductive metal or metal alloy. In particular embodiments, electrode coupler 70 may be made from a single length of metal wire or rod that is bent or formed into a particular, suitable shape, such as for example the shape of electrode coupler 70 of FIG. 7. In particular embodiments, electrode coupler 70 may be formed from a length of electrically conductive rod or wire that has a substantially circular, square, or flat cross-section, or any suitable cross-section. In particular embodiments, electrode coupler 70 may be made from spring wire, spring temper wire, or a wire or metallic material that has spring-like properties. In particular embodiments, electrode coupler 70 may be made from a material that resists bending or deformation when a bending or compressive force is applied to it and tends to return to an original or undeformed shape once such a force is removed. In particular embodiments, electrode coupler 70 may be made from a material that may be bent or formed into a particular shape, and once formed, electrode coupler 70 may substantially retain its shape as formed.

Figure 8:
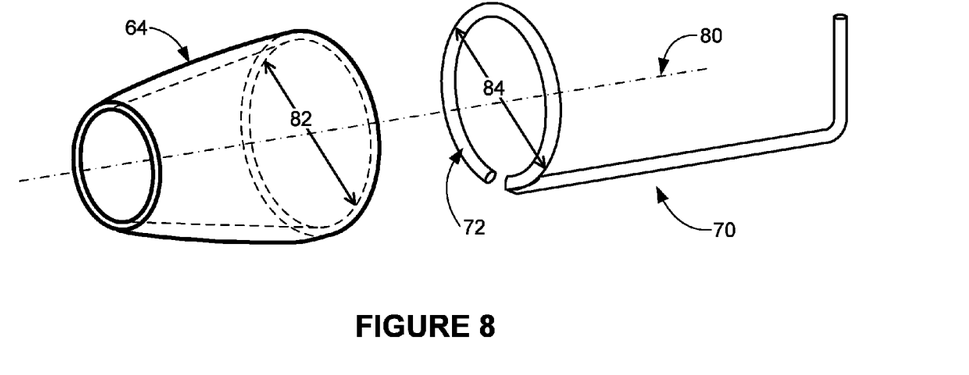
FIG. 8 illustrates an example electrode and an example electrode coupler.

FIG. 8 illustrates an example electrode 64 and an example electrode coupler 70. In FIG. 8, line 80 may represent a central longitudinal axis of active stylus 20. In FIG. 8, example ring end 72 has a substantially circular shape that is oriented approximately orthogonal to line 80, and ring end 72 has a center approximately coincident with line 80. In FIG. 8, ring end 72 has an outside dimension indicated by outer diameter 84, where outer diameter 84 corresponds to a diameter of the outer circular portion of ring end 72. In FIG. 8 and as discussed above, electrode 64 may have a substantially circular, conical, cylindrical, or ring-like shape, and electrode 64 includes a hollow region or an interior portion. In FIG. 8, electrode 64 and interior portion of electrode 64 are oriented substantially along line 80. In particular embodiments, electrode 64 may have a uniform shape that exhibits rotational symmetry about line 80. In FIG. 8, electrode 64 has an interior dimension indicated by inner diameter 82. In particular embodiments, inner diameter 82 corresponds to a diameter of the inner portion of electrode 64 that faces or is closer to ring end 72. In particular embodiments, outer diameter 84 of ring end 72 may be larger than inner diameter 82 of electrode 64. In particular embodiments, outer diameter 84 may be slightly larger than inner diameter 82. In particular embodiments, outer diameter 84 may be larger than inner diameter 82 by approximately 5% to 10%, or by any suitable percentage. As an example and not by way of limitation, inner diameter 82 of electrode 64 may be approximately 12.0 mm, and outer diameter of ring end 72 may be approximately 12.6 mm, or approximately 5% larger than inner diameter 82. Although this disclosure describes and illustrates particular electrodes 64 having particular shapes, sizes, and interior portions, this disclosure contemplates any suitable electrode having any suitable shape, any suitable size, and any suitable interior portion.

Figure 9:
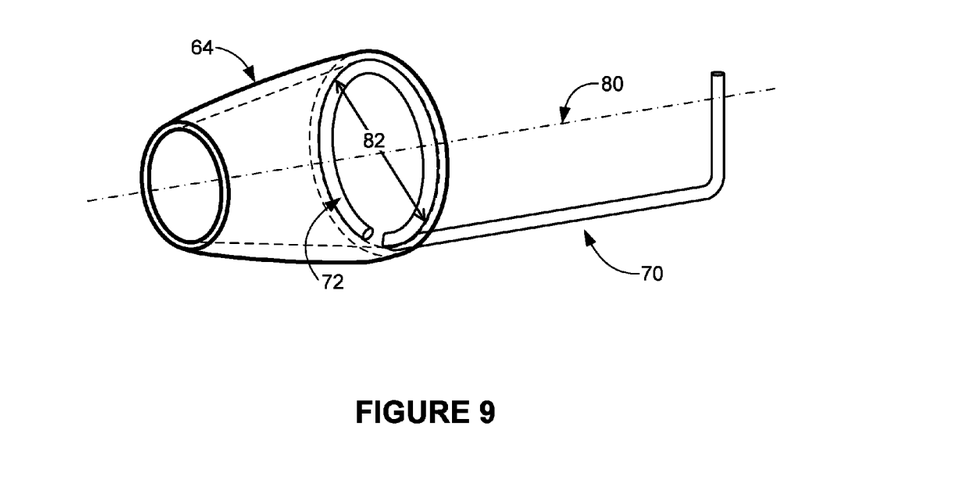
FIG. 9 illustrates the example electrode of FIG. 8 coupled to the example electrode coupler of FIG. 8.

FIG. 9 illustrates the example electrode 64 of FIG. 8 coupled to the example electrode coupler 70 of FIG. 8. In particular embodiments, ring end 72 of electrode coupler 70 may mechanically engage with electrode 64, and ring end 72 may fit within interior portion of electrode 64. In particular embodiments, ring end 72 may fit within interior portion of electrode 64, and ring end 72 and electrode 64 may be electrically coupled. In particular embodiments, ring end 72 and electrode 64 may be electrically coupled such that an electrical signal may be coupled from electrode 64 to back end 76 of ring and vice versa. In FIG. 9, ring end 72 may be inserted into interior portion of electrode 64 by having ring end 72 deform to a ring shape with a smaller diameter. In FIG. 9, ring end 72 may have an undeformed outer diameter 84 that, when inserted into interior portion of electrode 64, is reduced to a deformed or smaller diameter that is approximately equal to inner diameter 82. In particular embodiments, an undeformed outer diameter 84 may refer to a diameter of ring end 72 when ring end is not subject to an external force. As an example and not by way of limitation, a ring end 72 having an undeformed diameter of 12.6 mm may by bent or deformed to a shape with a diameter of approximately 12.0 mm when ring end 72 is inserted into electrode 64. In particular embodiments, once ring end 72 is inserted into electrode 64, as illustrated in FIG. 9, ring end 72 may exert an outward flexing, restoring, or spring force against an interior wall of electrode 64. In particular embodiments, an outward spring force exerted by ring end 72 against electrode 64 may provide for a secure mechanical coupling and attachment of electrode coupler 70 and electrode 64. In particular embodiments, an outward spring force exerted by ring end 72 against electrode 64 may provide for a low-resistance electrical coupling or connection between electrode coupler 70 and electrode 64.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An active stylus, comprising:
   one or more computer-readable non-transitory storage media embodying logic for wirelessly communicating with a device through a touch sensor of the device;
   an electrode for wirelessly receiving or transmitting signals through the touch sensor of the device to enable the communication, wherein the electrode is disposed at or near a tip of the active stylus; and
   a conductive element providing at least a portion of a connection between the electrode and the media, wherein the conductive element is made of a single piece of conductive material and comprises:
   a first end connected to a circuit board of the active stylus that the media is disposed on;
   a second end comprising a deformable ring configured to fit within an interior portion of the electrode, wherein the ring when undeformed has an outer diameter that is larger than an inner diameter of the interior portion of the electrode; and
   a rod extending from the first end to the second end.

2. The active stylus of claim 1, wherein:
   the electrode is a receive electrode for wirelessly receiving signals from the device through the touch sensor of the device; and
   the active stylus further comprises a transmit electrode for wirelessly transmitting signals to the device through the touch sensor of the device.

3. The active stylus of claim 1, wherein:
   the electrode is a transmit electrode for wirelessly transmitting signals to the device through the touch sensor of the device; and
   the active stylus further comprises a receive electrode for wirelessly receiving signals from the device through the touch sensor of the device.

4. The active stylus of claim 1, wherein the conductive element is formed from a single length of conductive metal with a substantially circular cross-section.

5. The active stylus of claim 1, wherein the conductive element is made of spring steel.

6. The active stylus of claim 1, wherein the deformable ring has a substantially circular shape.

7. The active stylus of claim 1, wherein the outer diameter of the undeformed ring is 5% to 10% larger than the inner diameter of the interior portion of the electrode.

8. The active stylus of claim 1, wherein the electrode has a shape of a truncated cone.

9. The active stylus of claim 1, wherein the electrode comprises an electrically conductive material.

10. The active stylus of claim 1, wherein the deformable ring has a substantially semicircular shape, elliptical shape, or semielliptical shape.

* * * * *